United States Patent [19]

Lonsdale et al.

[11] Patent Number: 4,678,288

[45] Date of Patent: Jul. 7, 1987

[54] TRIFOCAL LENS FOR A LASER INSTRUMENT

[75] Inventors: Randall J. Lonsdale; Ronald A. Hellekson, both of Eugene, Oreg.

[73] Assignee: Spectra-Physics, Inc., San Jose, Calif.

[21] Appl. No.: 604,916

[22] Filed: Apr. 27, 1984

[51] Int. Cl.⁴ .......................... B29D 13/18; G06K 7/10
[52] U.S. Cl. .................................... 350/432; 250/566; 235/472
[58] Field of Search .................. 350/432, 445, 446; 250/566, 568; 235/472

[56] References Cited

U.S. PATENT DOCUMENTS 3,991,275  11/1976  Balthuis .............................. 250/566
4,496,831   1/1985  Swartz et al. ........................ 235/472

*Primary Examiner*—John K. Corbin
*Assistant Examiner*—Paul M. Dzierzynski
*Attorney, Agent, or Firm*—Donald C. Feix; Paul Davis; Thomas M. Freiburger

[57] ABSTRACT

A laser instrument of the kind used to read or to detect light reflected from a target which is spaced from the laser instrument comprises a laser for generating a laser beam for transmission to the target, and a detector for detecting light reflected from the target and a trifocal, composite, single piece lens system. The trifocal lens system receives the laser beam from the laser at an angle which is off the optical axis of the lens system, routes the received laser beam onto the optical axis for transmission through the lens system and toward the target, collects light reflected from the target and images and transmits the collected light along the optical axis to the detector means. In a specific embodiment of the invention the trifocal, composite, single piece lens system is a plastic molded structure.

23 Claims, 10 Drawing Figures

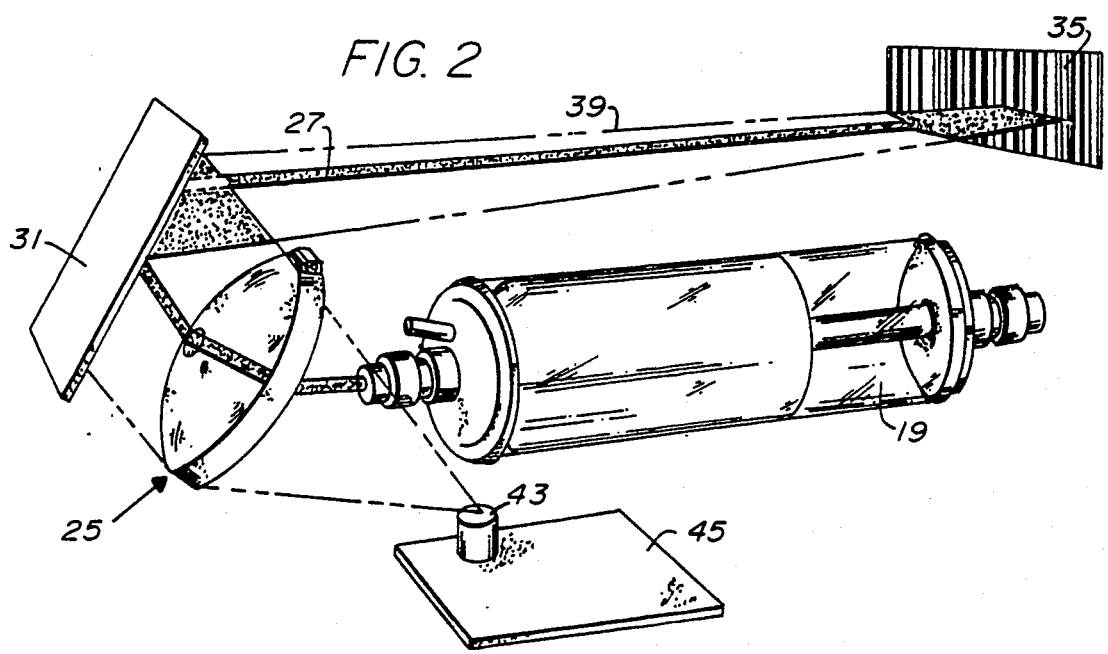
FIG. 2
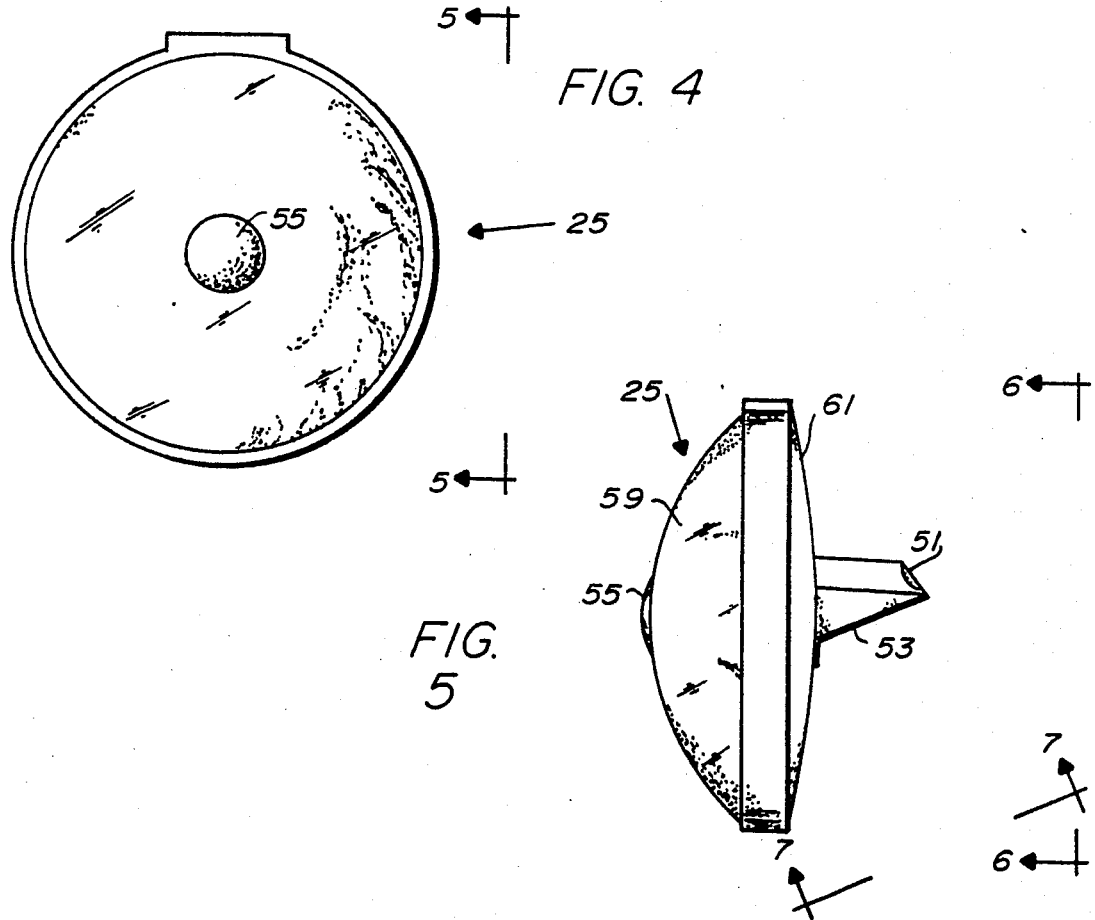
FIG. 4
FIG. 5

FIG. 6
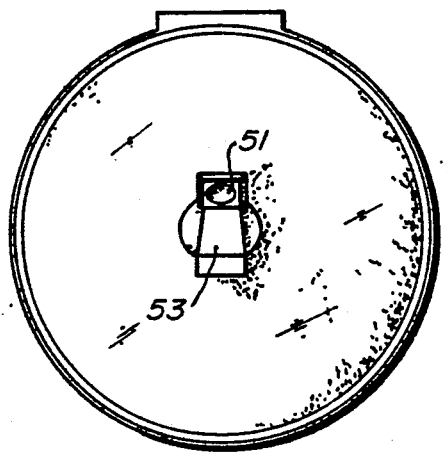
FIG. 9
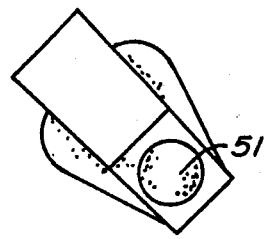
FIG. 8
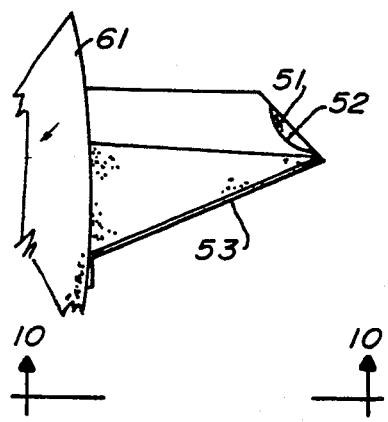
FIG. 7
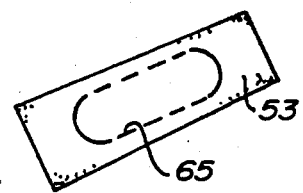
FIG. 10
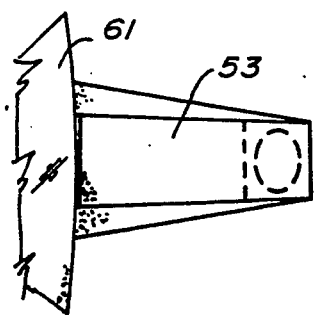

TRIFOCAL LENS FOR A LASER INSTRUMENT

BACKGROUND OF THE INVENTION:

The present invention relates to laser instruments and in particular to laser instruments of the kind used to read or to detect light reflected from a target which is spaced from the laser instrument.

The present invention has particular application to a handheld scanner used for reading bar code labels.

The present invention embodies a retro-directive lens system in which a transmitted light beam is directed out along one path and the reflected light is collected along the same path.

Retro-directive lens systems of this kind present a problem of conducting a beam from a laser into the lens system in such a way that the structure for receiving the beam from the laser and for routing that beam onto and along the optical axis of the lens system does not produce excessive shadowing or obstruction of the light collected and focused by the retro-directive lens system.

It is an important object of the present invention to construct a trifocal, composite, single piece lens for a laser instrument and to incorporate the lens in a laser instrument in a way which avoids the problems of retro-directive lens systems as used in the prior art.

Other important objects of the present invention are: to minimize the physical size of the structure required for receiving the beam from the laser at an angle off the optical axis and for routing the received beam onto the optical axis; to incorporate such beam receiving and routing structure integrally into a one piece, composite lens; and to associate the beam receiving and routing structure and the other elements of the lens with the laser in a way that minimizes shadowing and obstruction of the reflected light collected and imaged by the composite lens.

It is a related object of the present invention to accomplish the objects noted above with a lens system that provides a substantial depth of field in operation of a laser instrument so that light reflected from the target can be detected or read within an extended range of distances of the target from the laser instrument.

SUMMARY OF THE INVENTION:

A laser instrument of the kind used to read or to detect light reflected from a target which is spaced from the laser instrument and constructed in accordance with the present invention includes: a laser for generating a laser beam for transmission to the target; a detector for detecting light reflected from the target; and a trifocal, composite, single piece lens.

The lens is constructed to receive a laser beam from the laser at an angle which is off the optical axis of the lens, to route the received laser beam onto the optical axis for transmision through the lens toward the target, to collect light reflected from the target and to image the collected light along the optical axis to the detector.

The lens system of the present invention is a retro-directive lens system.

The trifocal lens includes a beam expander element, a prism and a focusing element for receiving the laser beam and for transmitting the laser beam through the lens and to convergence at a relatively narrow angle to a waist at a distance of at least several inches away from the lens.

The trifocal lens includes a collection lens having a first curved surface on a side which receives the light reflected from the target and a second curved surface on a side facing the detector means. The first and second curved surfaces are asphere surfaces, and the curvatures of these surfaces are effective to collect light received from the target within a considerable depth of field from the lens while imaging the collected light in a relatively fast focusing function at a relatively short distance from the lens. This provides substantial flexibility in reading light reflected from a target within an extended range of distances of the target from the forward end of the laser instrument.

The beam expander element and the prism are protruding from a central part of the second curved surface of the collection lens and are sufficiently small in size to minimize shadowing or obstructing the image cone of light produced by the two asphere surfaces of the collection lens.

In a specific embodiment of the present invention, the trifocal, composite, single piece lens is a plastic molded construction.

The single piece construction minimizes the number of reflective and/or refractive surfaces between the components of the lens and provides a lens which has a low loss of power in transmission and which is low in attenuation.

Laser instrument apparatus and methods which incorporate the features noted above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is an isometric, pictorial view showing how the trifocal lens optical system of the present invention is used to read a bar code label.

FIG. 3 is a diagrammatic, orthographic view illustrating focusing features of the trifocal lens shown in FIGS. 1 and 2.

FIG. 4 is an end elevation view of the trifocal lens and is taken generally along the line and in the direction indicated by the arrows 4—4 in FIG. 1.

FIG. 5 is a side elevation view taken along the line and in the direction indicated by the arrows 5—5 in FIG. 4.

FIG. 6 is an end elevation view taken along the line and in the direction indicated by the arrows 6—6 in FIG. 5.

FIG. 7 is a fragmentary view taken generally along the line and in the direction indicated by the arrows 7—7 in Figure 5 and illustrates details of the prism element of the trifocal lens.

FIG. 8 is a fragmentary, enlarged view of the beam expander element and prism element of the trifocal lens shown in FIG. 5.

FIG. 9 is a view taken along the line and in the direction indicated by the arrows 9—9 in FIG. 8.

FIG. 10 is a view taken along the line and in the direction indicated by the arrows 10—10 in FIG. 8.

Figure 1:
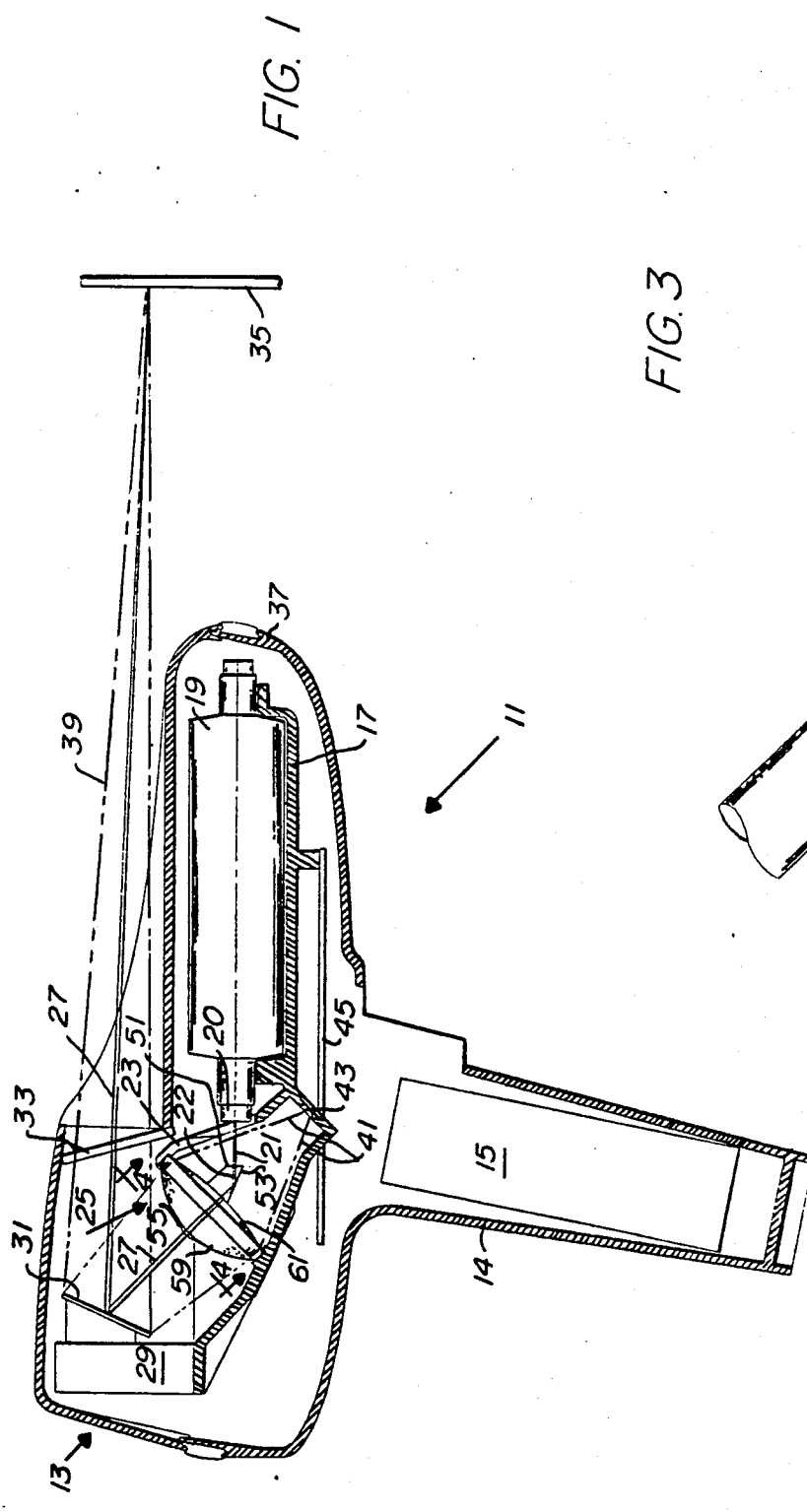
FIG. 1 is a side elevation view, partly in cross section to show details of construction, of a laser instrument constructed in accordance with one embodiment of the present invention and embodying a trifocal lens optical system.

DESCRIPTION OF THE PREFERRED EMBODIMENTS:

A handheld, portable laser scanner constructed in accordance with one embodiment of the present invention is indicated generally by the reference numeral 11 in FIG. 1.

As illustrated in FIG. 1, the handheld laser scanner 11 includes an outer housing 13 which has a lower handle portion 14 as illustrated.

A power supply 15 is contained within the handle portion.

The housing 13 mounts an optics chassis 17.

A helium-neon laser tube 19 is mounted within a cradle at one end of the optics chassis 17. The laser tube 19 produces a laser beam of red light at 632.8 nanometers (nm). Other types of lasers, such as, for example, laser diodes and non-helium-neon lasers can be used instead of the helium-neon laser illustrated. This light is transmitted from the tube 19 in a beam 21. The beam 21 passes through an opening 23 in the chassis 17 and is received by a trifocal lens 25.

As will be described in greater detail below, the trifocal lens 25 receives the beam 21 at an angle which is inclined to the optical axis X—X (see FIG. 3) of the lens and routes the received beam onto the optical axis of the lens as a transmitted beam 27.

A scanning device 29 is mounted on an end of the chassis 17 and includes a dithering reflective mirror 31 which scans the transmitted beam 27.

The housing includes a window 33 which has plano-plano, abrasion resistant, coated surfaces; and the transmitted beam 27 passes through the window 33 to a target 35.

The transmitted beam 27 is converged (at a relatively small angle) to a waist at the target as illustrated in FIG. 1. The waist is located at a distance which is at least several inches away from the nose 37 of the scanner 11.

The narrow angle at which the beam 27 is converged in combination with the curvature of the optics for collecting and imaging the reflected light permit effective reading or detecting of light reflected from the target 35 within an extended range of positions of the target with respect to the laser instrument 11. This will be described in greater detail below. The optical system of the present invention provides a considerable depth of field for reading or detecting light reflected from the target 35 and enables the laser instrument to be used effectively without requiring a high degree of skill in the operator.

Light from the transmitted beam 27 which strikes the target 35 is reflected back toward the window 33 in a cone indicated by the reference numeral 39. This reflected light is scanned by the dithering mirror 31 and reflected down and into the lens 25 as indicated in FIG. 1. The lens 25 collects and images the reflected light in a direction along the optical axis of the lens 25. The imaging cone is indicated by the reference numeral 41.

The imaging cone 41 is focused onto a photo detector 43 in a very fast focusing function and in a short distance. This minimizes the structure required and facilitates making the whole scanner unit compact. This focusing function also contributes to the depth of field of the overall system.

The photo detector 43 is associated with a printed circuit board 45 which converts the collected light signals to electronic signals.

The photo detector 43 is mounted in a fixed position with respect to the lens 25 by the chassis 17.

Before leaving the discussion of FIG. 1, it should be noted that the end of the laser tube 19 is located in close proximity to the lens 25 so that the received beam 21 travels only a short path before being received by the lens 25. This is desirable to make the laser instrument as small and as compact as possible. This proximity is accomplished in the present invention without shadowing or obstructing the image cone 41 with the end 20 of the laser tube.

FIG. 2 illustrates how the scanner structure described above is used for reading bar code labels.

It should be noted, however, that the trifocal lens optical system of the present invention can also be used in non scanner applications. It can, for example, be used for reading labels on moving targets, such as boxes on a conveyor belt.

The scanner 11 and the trifocal lens 25 also permit labels to be read with the scanner 11 held at a wide variety of attitudes or angles with respect to the target. The laser instrument 11 is, for example, effective to read signals with the scanner at vertical angles between +70 degrees and −70 degrees and at horizontal angles between −45 degrees and +45 degrees with respect to the normal from the target 35. It can be used within a substantial range of twisting angles of the laser device 11 with respect to the target and at all compound angles within these ranges.

The lens 25 will now be described in more detail with specific reference to FIGS. 3 through 10.

As illustrated in these figures, the lens 25 is a trifocal, composite, single piece lens having an optical axis X—X.

The 25 has optical means for receiving the beam 21 from the laser and for routing the received beam onto the optical axis X—X for transmission through the lens 25 toward the target 35. This first optical means includes a beam expander element 51, a prism 53 and a focusing lens 55 which are associated with the beam 21 as received from the laser and the beam 27 as transmitted to the target.

The lens 25 also has optical means for collecting light reflected from the target and for imaging the collected light along the optical axis X—X to a photodetector 43. This second optical means includes a collection lens 57 which has a first curved surface 59 on the side which receives the light 39 reflected from the target and a second curved surface 61 on the side which faces the photo detector 43.

The lens 25 receives the laser beam 21 at an angle which is inclined to the optical axis X—X.

The beam expander element 51 expands the beam (as the expanded beam 22) and this expanded beam 22 is reflected by the prism 53 and routed along the optical axis X—X to the focusing lens 55.

The focusing lens 55 focuses and converges the expanded beam 22 to a waist 56 at the target 35 as illustrated in FIG. 3. The convergence is at a relatively narrow angle so that the waist 56 is located a substantial distance away from the reference plane B of the lens 25. This feature permits a substantial amount of reflected light to be reflected within the effective bounds of the cone 39, even though the target 35 is shifted to a substantial extent to the left or to the right of the position shown in FIG. 3. This feature thus faciliates effective operation of the laser instrument 11 over an extended depth of field.

The collection lens 57 receives the light reflected within the cone 39 and images and transmits the collected light along the optical axis X—X within the imaging cone 41 to the detector 43. The first curved surface 59 of lens 57 is an asphere, and the second curved surface 61 of the collection lens is an asphere.

The surface of the focusing lens 55 is a sphere. The surface 52 of the expanding lens 51 is a sphere. See FIG. 8.

The reflecting surface of the prism 53 is a plano surface.

In FIG. 7 the area within the line 65 is a zone which equals a clear aperture on the prism reflective surface.

It is an important feature of the present invention that the structure for receiving the beam from the laser 19, for expanding the received beam, and for routing that beam along the optical axis of the lens 25 protrudes from the surface 61 and is small enough in size so as to minimize shadowing or obstruction of the image cone 41.

It is another important feature of the present invention that all of the elements of the lens 25 are integrated into a single piece. In one specific embodiment of the present invention, the lens 25 is a plastic molded structure.

It is another important feature of the invention that the one piece, composite construction of the lens 25 minimizes the number of reflective and/or refractive surfaces between different component parts of the lens. Thus, for example, there is no refractive surface between the expanding lens 51 and the prism 53. This construction provides low loss of power in transmission and produces a lens which is low in attenuation.

In a specific embodiment of the present invention the target 35 is a diffuse reflector conforming to a Lambertian distribution, and the target 35 is located 12 inches from the datum plane B shown in FIG. 3. In that specific embodiment the collected light cone 41 corresponds to the front conjugate of the collection lens 57, and the light cone focuses 1.366 inches from the datum plane B when the target 35 is at 12.0 inches from the datum plane B. In this specific embodiment the focal length of the collection lens equals 1.25 inches. The focusing lens 55 has a radius of 0.36458 inches and a focal length equal to 0.744 inches. The prism 53 has a highly polished plano surface with a radius of 23.40 inches or longer. The beam expander lens 51 has a radius of 0.104635 and a focal length equal 0.214 inches. The helium-neon laser 19 produces a red line at 632.8 nm, 1.2 m radian, ½ angle divergence.

While we have illustrated and described the preferred embodiments of our invention, it is to be understood that these are capable of variation and modification, and we therefore do not wish to be limited to the precise details set forth, but desire to avail ourselves of such changes and alternations as fall within the purview of the following claims.

We claim:

1. A composite, single piece, lens system for a laser instrument of the kind used to read or to detect light reflected from a target which is spaced from the laser instrument, said lens system comprising,
   an optical axis for the composite, single piece, lens system,
   first optical means for receiving a laser beam which is generated and which is transmitted to the lens system at an angle which is off said optical axis and for routing the received laser beam onto said optical axis for transmission through the lens system toward the target,
   second optical means for collecting light reflected from the target and for imaging the collected light along said optical axis to detector means associated with the lens system,
   said first optical means including a beam expander element, a prism, and a focusing element,
   said second optical means including a collection lens having a first curved surface on a side which receives the light reflected from the target and a second curved surface on a side facing the detector means, and
   wherein the first optical means and the second optical means are embodied in a composite, single piece lens structure.

2. The invention defined in claim 1 wherein the composite, single piece, lens structure is a plastic molded structure.

3. The invention defined in claim 1 wherein the composite, single piece, lens structure is arranged in a retro-directive lens system.

4. The invention defined in claim 1 wherein the beam expander element and the prism protrude from a central part of the second curved surface of the collection lens and are sufficiently small in size as to minimize shadowing or obstructing the image cone of light produced by the second curved surface of the collection lens.

5. The invention defined in claim 1 wherein the focusing element focuses the transmitted laser light beam at a substantial distance from the lens system and wherein the curvature of the first and second curved surfaces of the collection lens are effective to collect light reflected from a target within a considerable depth of field from the focal distance of the focusing lens while imaging the collected light in a relatively fast focusing function at a relatively short distance from the lens assembly to thereby provide substantial flexibility in reading a signal on a target within an extended range of distances of the target from the lens assembly.

6. The invention defined in claim 5 wherein the expanding lens has a spherical front surface, the focusing lens has a spherical front surface, the first surface of the collection lens is an asphere and the second surface of the collection lens is an asphere.

7. The invention defined in claim 1 wherein the focusing lens focuses the transmitted laser beam at about twelve inches from the optical center of the lens system and the collection lens focuses the collected light at a distance of about 1.4 inches from the optical center of the lens assembly.

8. The invention defined in claim 2 wherein the one piece molded construction minimizes the number of reflective and/or refractive surfaces between the components of the lens system to provide a lens system which has a low loss of power in transmission and which is low in attenuation.

9. A laser instrument of the kind used to read or to detect light reflected from a target which is spaced from the laser instrument, said laser instrument comprising,
   laser means for generating a laser beam for transmission to the target,
   detector means for detecting light reflected from the target, and
   trifocal, composite, single piece lens means having an optical axis and constructed to receive the laser beam from the laser means at an angle which is off the optical axis, to route the received laser beam onto the optical axis for transmission through the lens means toward the target, to collect light reflected from the target and to image the collected light along the optical axis to the detector means.

10. The invention defined in claim 9 wherein the trifocal, composite, single piece lens means are embodied in a plastic molded structure.

11. The invention defined in claim 9 wherein the trifocal, composite, single piece lens means are arranged in a retro-directive lens system.

12. The invention defined in claim 9 wherein the trifocal, composite, single piece lens means include a beam expander element, a prism and a focusing element for receiving the laser beam and for transmitting the laser beam through the lens means and to convergence at a relatively narrow angle to a waist at a distance of at least several inches in front of the forward end of the laser instrument.

13. The invention defined in claim 12 wherein the lens means include a collection lens having a first curved surface on a side which receives the light reflected from a target and a second curved surface on a side facing the detector means.

14. The invention defined in claim 13 wherein the first and second curved surfaces are asphere surfaces and the curvature of the first and second curved surfaces are effective to collect light received from a target within a considerable depth of field from the lens means while imaging the collected light in a relatively fast focusing function at a relatively short distance from the lens means to thereby provide substantial flexibility in reading light reflected from a target within an extended range of distances of the target from the forward end of the laser instrument.

15. The invention defined in claim 13 wherein the beam expander element and the prism protrude from a central part of the second curved surface and are sufficiently small in size to minimize shadowing or obstructing the image cone of light produced by the second curved surface.

16. The invention defined in claim 13 wherein the focusing lens focuses the transmitted laser beam at about 12 inches from the optical center of the lens means and the collection lens focuses the collected light at a distance of about 1.4 inches from the optical center of the lens means.

17. The invention defined in claim 10 wherein the one piece molded construction minimizes the number of reflective and/or refractive surfaces between the components of the lens means to provide a lens means which has a low loss of power in transmission and which is low in attenuation.

18. The invention defined in claim 1 wherein the laser means comprises a helium-neon laser tube and the output end of the tube is mounted in close proximity to the lens means without obstructing or shadowing the imaged light.

19. The invention defined in claim 1 including scanning means for scanning both the beam transmitted to the target and the light reflected from the target and collected by the lens means.

20. The invention defined in claim 19 including chassis means for holding the laser means, detector means, lens means, and scanner means in position within the laser instrument.

21. The invention defined in claim 20 including a printed circuit board operatively associated with the detector means and mounted in position by the chassis means.

22. The invention defined in claim 21 wherein the laser instrument contains an outer housing which enables the laser instrument to be used as a portable, hand-held, scanner for reading bar code labels.

23. A method of reading or detecting light reflected from a target by use of a laser beam and a retro-directive lens system, said method comprising,
   generating a laser beam and transmitting the laser beam from the laser to the retro-directive lens system,
   receiving the laser beam in the lens system at an angle which is off the optical axis of the lens system,
   routing the received laser beam onto the optical axis for transmission through the lens system to the target,
   collecting light reflected from the target by a collection lens element in the retro-directive lens system,
   imaging the collected light along the optical axis of the lens system to detector means associated with the lens system,
   said step of receiving the light beam from the laser and routing the received light beam onto the optical axis being accomplished by a beam expander element and a prism, and
   supporting the beam expansion element and the prism directly from the collection lens while minimizing the shadowing or obstructing of the image cone of light produced by the collection lens.

* * * * *